United States Patent
Xu et al.

(10) Patent No.: US 8,959,278 B2
(45) Date of Patent: Feb. 17, 2015

(54) SYSTEM AND METHOD FOR SCALABLE MOVEMENT AND REPLICATION OF DATA

(75) Inventors: Kun Xu, Austin, TX (US); Tommi M. Jokinen, Austin, TX (US); David B. Kramer, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 577 days.

(21) Appl. No.: 13/106,703

(22) Filed: May 12, 2011

(65) Prior Publication Data

US 2012/0290808 A1   Nov. 15, 2012

(51) Int. Cl.
*G06F 12/00* (2006.01)
*G06F 12/02* (2006.01)

(52) U.S. Cl.
CPC ............ *G06F 12/02* (2013.01); *G06F 12/0284* (2013.01); *G06F 2212/254* (2013.01)
USPC ....................................... 711/103

(58) Field of Classification Search
CPC .................................................. G06F 12/00
USPC .......................................... 710/22; 711/103
See application file for complete search history.

(56) References Cited

U.S. PATENT DOCUMENTS

| | | | |
|---|---|---|---|
| 5,732,094 A | 3/1998 | Petersen et al. | |
| 6,986,020 B2 | 1/2006 | Barry et al. | |
| 2004/0267979 A1* | 12/2004 | Futral et al. | 710/22 |
| 2005/0097244 A1* | 5/2005 | Hayasaka | 710/52 |
| 2005/0204058 A1* | 9/2005 | Philbrick et al. | 709/238 |
| 2006/0031603 A1 | 2/2006 | Bradfield et al. | |
| 2009/0031054 A1* | 1/2009 | Kato | 710/22 |
| 2011/0078342 A1* | 3/2011 | Siddabathuni et al. | 710/22 |

FOREIGN PATENT DOCUMENTS

WO    WO0106377    1/2001

* cited by examiner

*Primary Examiner* — April Y Blair
*Assistant Examiner* — Trang Ta
(74) *Attorney, Agent, or Firm* — Gary Stanford

(57) ABSTRACT

A method of multicast data transfer including accessing a source address to a source location of mapped memory which stores source data, accessing multiple destination addresses to corresponding destination locations of the mapped memory, and for each of at least one section of the source data, reading the section using the source address, storing the section into a local memory of a data transfer device, and writing the section from the local memory to each destination location in the mapped memory using the destination addresses. Separate source and destination attributes may be provided, so that the source and each destination may have different attributes for reading and storing data. The source and each destination may have any number of data buffers accessible by corresponding links provided in data structures supporting the data transfer. The source data may be divided into sections and handled section by section.

19 Claims, 7 Drawing Sheets

SYSTEM AND METHOD FOR SCALABLE MOVEMENT AND REPLICATION OF DATA

BACKGROUND OF THE INVENTION

1. Field of the Invention

The present invention relates generally to data movement or replication, and more particularly to a system and method of multicast movement and/or replication of source data in a scalable manner.

2. Description of the Related Art

Conventional direct memory access (DMA) operations move information from one location to another, typically independent of a central processor or central processing unit (CPU). Conventional DMA operations are inefficient when the information is moved from a source location to multiple destination locations since the same source information had to be read for each destination requiring multiple reads from the same source location. The inefficiency is made worse when the multiple destinations have different attributes, such as different offsets and byte counts. For applications in which the source information is copied to many (e.g., up to thousands of) target locations, repeated source reads dramatically multiplies system bandwidth consumption.

In certain data path applications, source data, such as packet header data, is copied to multiple target locations. Conventional DMA is sufficient in normal memory copy applications in which the source data is copied to a single target. Conventional DMA is not efficient in multicast applications since it requires one read per target. DMA transactions in a multicast application is inefficient and consumes valuable system bandwidth.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
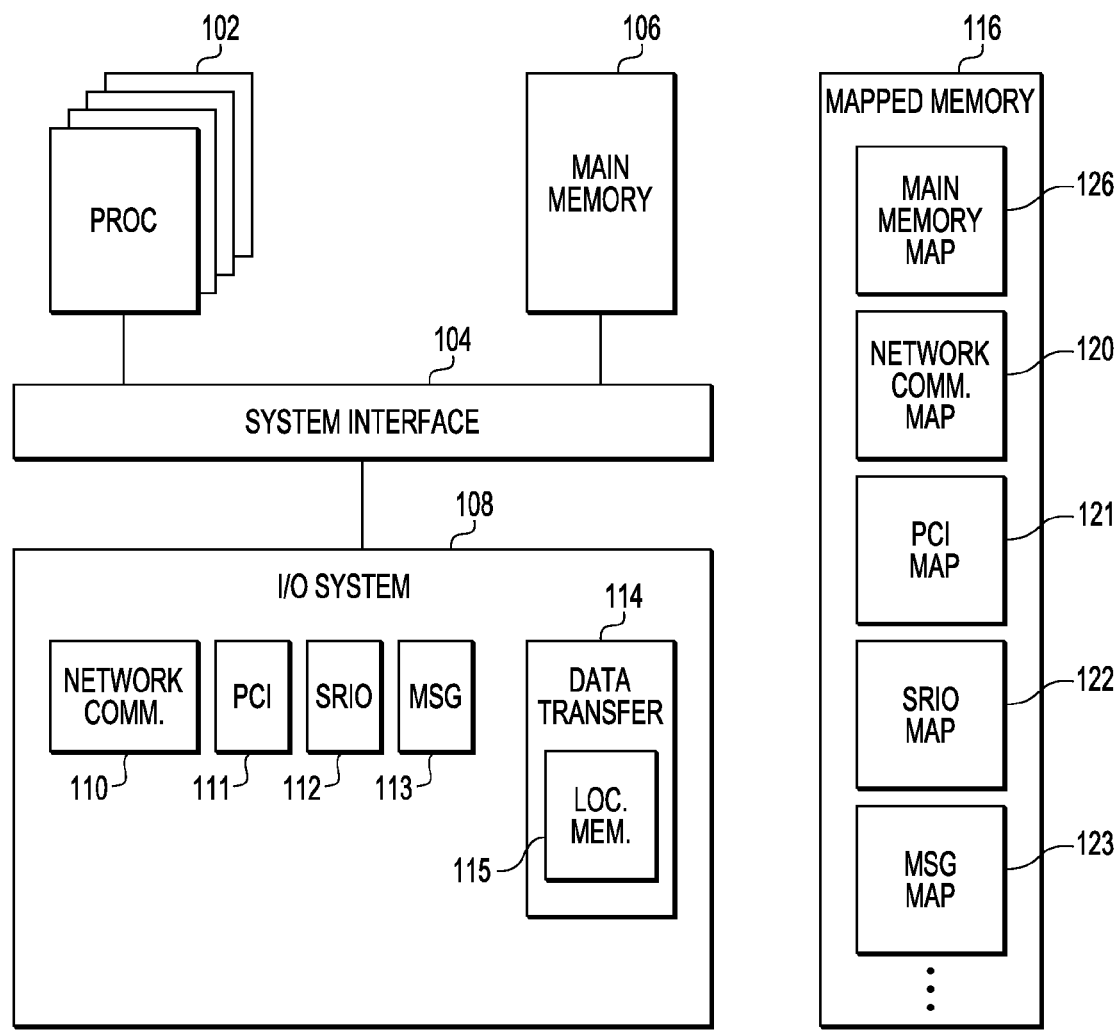
FIG. 1 is simplified block diagram of a processing system including a data transfer engine implemented according to one embodiment.

FIG. 1 is simplified block diagram of a processing system 100 including a data transfer device 114 implemented according to one embodiment. Although the data transfer device 114 may transfer data similar to direct memory access (DMA) devices, it is understood that the present invention is not limited to DMA configurations. The processing system 100 includes one or more core processors 102 coupled to a system interface 104. The system interface 104 further couples a main memory 106 and an input/output (I/O) system 108. Although multiple core processors 102 may be included, it is understood that any number of core processors are contemplated including a single processor system. The processing system 100 may be implemented as a system-on-chip (SOC) or as an embedded processing system or the like. The processing system 100 may be configured according to many different types of processing applications, such as digital signal processing, communication applications, multimedia applications, network applications, data storage applications, etc.

The main memory 106 is configured in any suitable manner. In one embodiment, the main memory 106 includes a cache portion (e.g., front-side L3 cache) and a primary or main memory portion. Although the cache portion is not separately shown, it is understood that separate cache devices are coupled to the system interface 104 for interfacing the main memory devices within the main memory 106. The main memory 106 may be implemented using any type of memory devices, such as random access memory (RAM) devices or the like. In one embodiment, the main memory 106 includes double data rate synchronous dynamic RAM (DDR SDRAM or DDR1 SDRAM, DDR2 SDRAM, DDR3 SDRAM, etc.) devices and the like, although alternative types of memory devices are contemplated, such as single data rate (SDR) SDRAM devices and the like.

The system interface 104 is configured according to any type of bus structure, switch structure, switch fabric, network structure, etc., for enabling communication between the core processors 102, the main memory 106 and various devices of the I/O system 108.

The I/O system 108 includes any number of separate or individual I/O systems or devices or components individually or collectively coupled to the system interface 104. As shown, for example, the I/O system 108 includes a network communication system 110, a peripheral component interconnect (PCI) system 111, a serial rapid I/O (SRIO) system 112, a message system 113, and the data transfer device 114. The network communication system 110 may be implemented according to any suitable network communication standard, such as Ethernet frame-based communications and the like. The PCI system 111 may be implemented according to PCIe or PCI Express or the like. The SRIO system 112 may be implemented according to the RapidIO architecture or the like. In one embodiment, the message system 113 is also implemented according to RapidIO, which is a high-performance packet-switched, interconnect technology. The illustrated I/O systems are exemplary only where it is understood that other types of I/O devices and/or additional devices are contemplated.

In one embodiment, the main memory and I/O devices of the processing system 100 are accessed or otherwise addressed according to a memory map of mapped memory 116. As shown, for example, the memory devices of the main memory 106 are memory-mapped into a main memory map 126, the devices of the network communication system 110 are memory-mapped to a network memory map 120, the devices of the PCI system 111 are memory-mapped to a PCI memory map 121, the devices of the SRIO system 112 are memory-mapped to an SRIO map 122, the devices of the message system 113 are memory-mapped to a message map 123, etc. Each memory map is an area of one or more addressable memory locations for reading from or writing to the devices of the main memory or I/O system as understood by those skilled in the art.

The data transfer device 114 may include memory mapped devices. The data transfer device 114 further includes a local memory 115 which is used for efficient multicast operations for movement or replication of information from one source to multiple destinations as further described herein.

Figure 2:
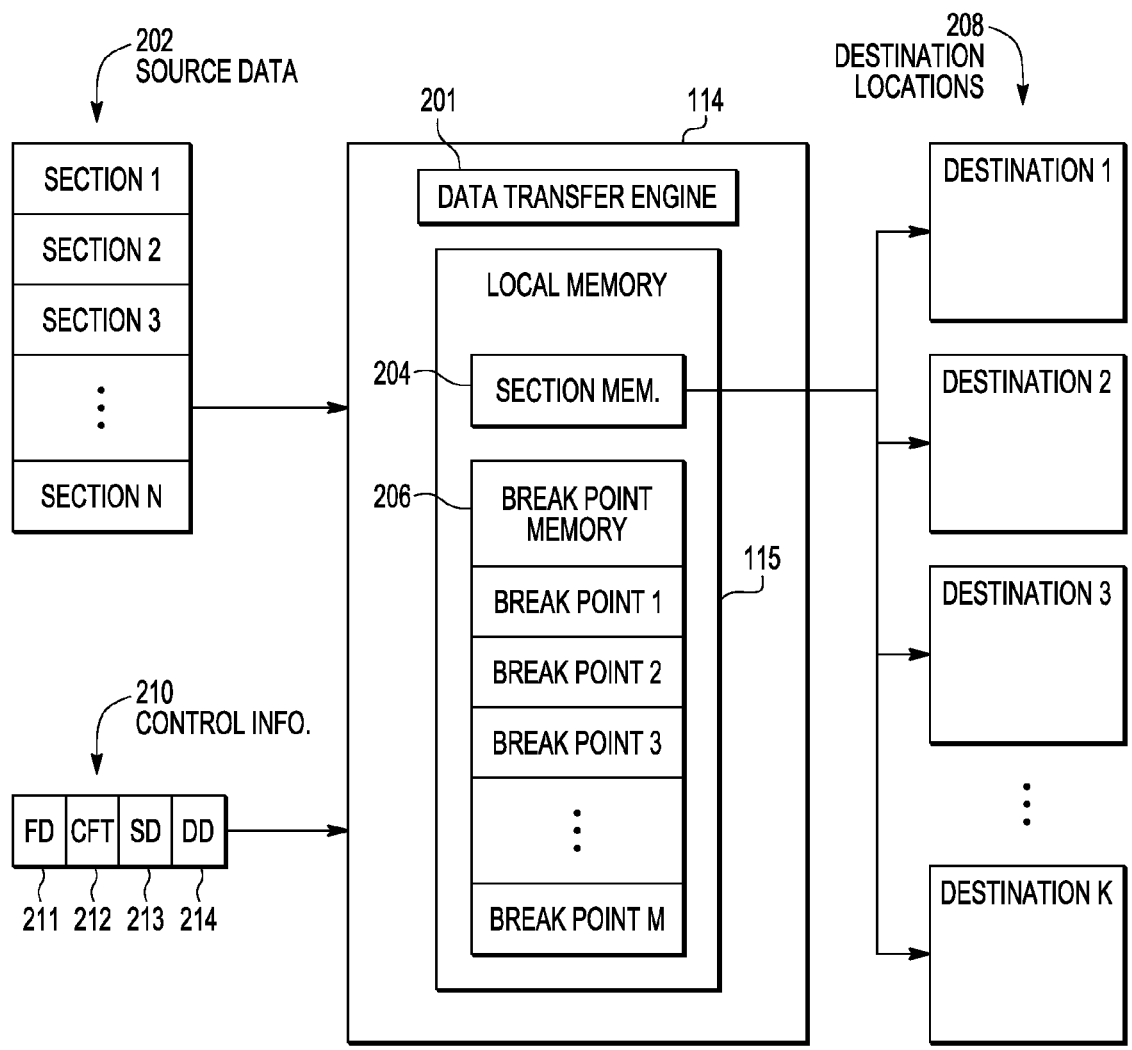
FIG. 2 is a block diagram of a multicast operation performed by the data transfer engine of FIG. 1 according to one embodiment.

FIG. 2 is a block diagram of a multicast operation performed by the data transfer device 114 according to one embodiment and an exemplary configuration of the data transfer device 114 according to one embodiment. Source data 202 is shown divided into an integer number N of separate data sections individually numbered 1-N. The data transfer device 114 includes the local memory 115 and a data transfer engine 201. The local memory 115 of the data transfer device 114 includes a section memory 204 for storing at least one section of the source data 202 at a time. The local memory 115 further includes a break point memory 206 for storing an integer number M of break points individually numbered 1-M. An integer number K of destination locations 208 are shown, individually numbered 1-K. The destination locations 208 are each associated with a target destination for receiving the source data. The data transfer engine 201 performs the memory transfer functions (reading, writing, copying, replicating, etc.) between the mapped memory 116 and the local memory 115.

Control information 210 is shown for controlling the transfer or copying of the source data 202 to each of the destination locations 1-K as further described herein. The control information 210 includes a frame descriptor (FD) 211, a compound frame table (CFT) 212, a source descriptor (SD) 213, and a destination descriptor (DD) 214. Generally, a device initiating a multicast operation, which is referred to herein as a source device, prepares the control information 210 used by the data transfer engine 201 of the data transfer device 114 for the multicast operation. Any device initiating the multicast operation, such as a core processor 102 or any appropriately configured I/O device, may incorporate the functions for generating the control information 210 or may invoke a software application (executed by the same or a different core processor 102) to prepare the control information 210.

The source data 202, the destination locations 208 and/or the corresponding data buffers are accessible according to the mapped memory 116. For example, data buffers in the main memory 106 are addressed according to the main memory map 126, and data buffers or registers or the like of any of the I/O devices 110, 111, 112, and 113 are addressed according to the corresponding memory map locations 120, 121, 122, and 123, respectively. Although not shown, registers of any of the core processors 102 may also be memory mapped as understood by those of ordinary skill in the art. Although the control information 210 may be stored within the main memory 106 and accessible via the main memory map 126, all or a portion of the control information may be located in any of the I/O devices and accessible via the corresponding memory map.

The data transfer device 114 performs the multicast operation using the control information 210. The data transfer engine 201 accesses the FD 211 for retrieving a location and format of the CFT 212 along with additional source attribute information. The data transfer engine 201 then accesses the CFT 212 for accessing further location and attribute information of the source and each of the destinations as further described herein. The CFT 212 includes address information to locate the SD 213 and the source data 202. The CFT 212 includes address information to locate each of the destination locations 208 along with a corresponding DD 214 providing additional information including attribute information for each of the destination locations.

The data transfer engine 201 reads a first section of the source data 202 and writes the data into its section memory 204 according to any source attribute information. The data transfer engine 201 then writes the retrieved first section to the beginning location of each of the destination locations 208 according to corresponding destination attribute information. After the first section of the source data 202 is written to each destination location, the data transfer engine 201 updates a corresponding break point in the break point memory 206 identifying the next addressable memory location of the destination location for storing the second section of source data.

After the first section (e.g., section 1) of the source data 202 is written to each of the destination locations 208, the process is substantially repeated for the second section (e.g., section 2) of the source data 208, except that the section is stored in each destination location beginning at the addressable location identified by the corresponding break point stored in the break point memory 206. Also, after the second section of the source data 202 is written to each destination, the data transfer engine 201 again updates the corresponding break point. Operation continues in this manner until each of the N sections of the source data 202 is written to each of the destination locations 208.

The transfer process is adjusted when the number of break points is limited to a predetermined number, such as M, and when the number of destination locations, such as K, is greater than M (e.g., K>M). In the event K>M, then the multicast operation is completed and then repeated for groups of M (or up to M) destination locations. The number M of the break points may be determined according to the particular implementation or based on the expected average or maximum number destination locations for a given configuration, or otherwise based on available memory.

Figure 3:
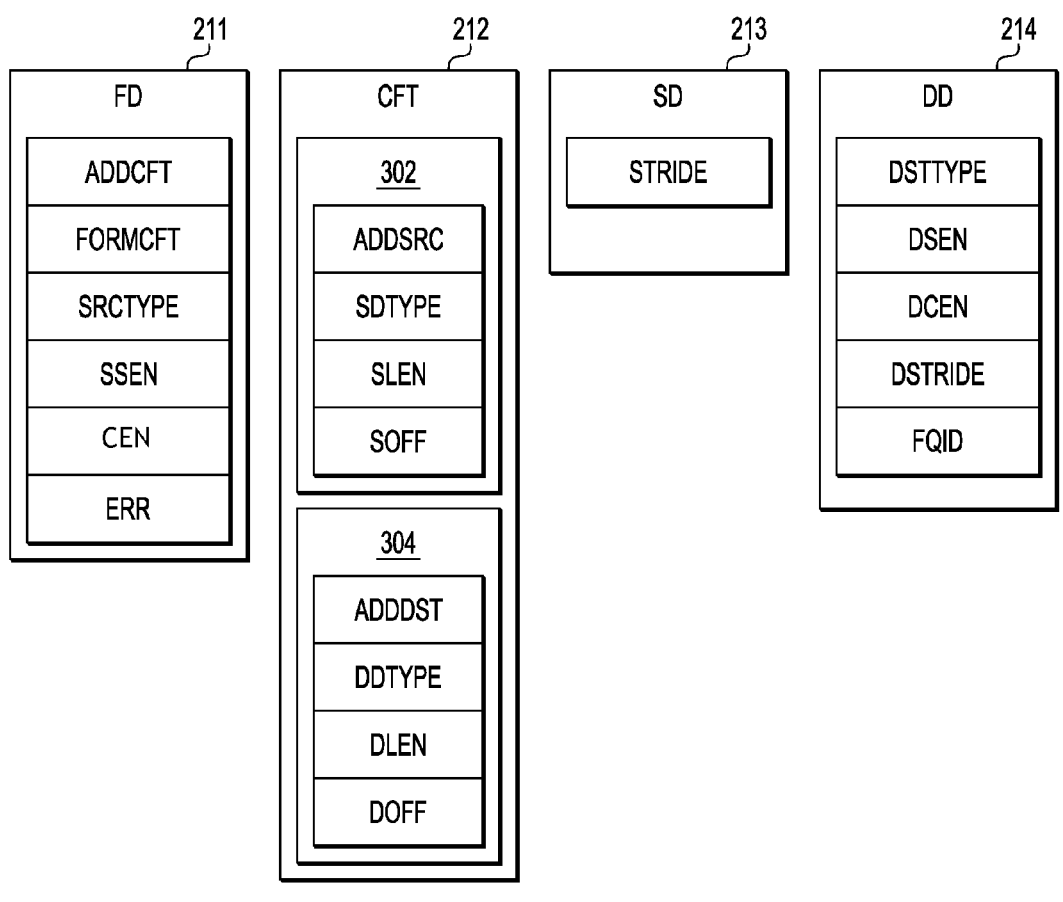
FIG. 3 is a block diagram illustrating a version of the control information of FIG. 2 according to one embodiment.

FIG. 3 is a block diagram illustrating a version of the control information 210 according to one embodiment. The FD 211 includes an address ADDCFT which points to or otherwise locates the CFT 212 in the memory map. A format value FORMCFT indicates whether the CFT 212 is a compound frame including multiple addresses for the DMA multicast operation. The FORMCFT value may be used to indicate a conventional DMA operation rather than a multicast operation. A SRCTYPE value is a source attribute which indicates a source read transaction type (for example, a snoop or non-snoop read, an enhanced type read, etc.) An SSEN value is a source stride enable indicating whether stride is operative when reading the source data 202. When stride is enabled, data is read in groups in which a stride size indicates the number of bytes to read before jumping to the next start location and a stride distance indicates the distance between consecutive start locations.

The FD 211 further includes a completion status queue enable value CEN which indicates whether completion results are to be reported and if so, which entities are informed of the completion. For example, CEN may include at least two bits in which 00b ("b" indicating a binary value) indicates that no completion results are queued, 01b indicates that completion results are queued to inform the source device, 10b indicates that completion results are queued to a frame queue identifier (FQID) specified in the corresponding DD 214 to inform the corresponding destination device associated with a destination location, and 11b indicates that completion results are queued to inform both the source and destination devices.

The FD 211 further includes a value ERR which generally indicates one or more error values which are not further described herein. The included parameters or attributes are exemplary only in which one or more may be omitted or modified and additional parameters or attributes may be included as desired for particular configurations or implementations.

The CFT 212 includes a source record 302 and one or more destination records 304. Although only one destination record 304 is shown, it is understood that additional destination records may be included, each substantially similar to the illustrated destination record. The source record 302 includes a source address ADDSRC, a source data type value SDTYPE, a source length value SLEN, and a source address offset value SOFF. ADDSRC is an address or pointer or the like to the SD 213. SDTYPE indicates whether the source data 202 is stored with the SD 213 or instead accessible by a source scatter/gather (SG) table as further described below. SLEN indicates the total length of the source data 202, such as in bits or bytes or any other suitable unit of digital information. SOFF is an address offset value used for accessing either the source data 202 or the source SG table after the SD 213. For example, SOFF is added to ADDSRC to access the source data 202 when SDTYPE indicates that the source data 202 is stored with the SD 213, or to access the source SG table when SDTYPE indicates that the source data 202 is instead accessible via the source SG table. The included parameters or attributes are exemplary only in which one or more may be omitted or modified and additional parameters or attributes may be included as desired for particular configurations or implementations.

Each destination record 304 includes a destination address ADDDST, a destination data type value DDTYPE, a destination length value DLEN, and a destination address offset value DOFF. ADDDST is an address or pointer or the like to the corresponding DD 214. DDTYPE indicates whether the corresponding destination location 208 is located with (or just after) the DD 214 or instead located according to a destination SG table as further described below. DLEN indicates the total length of the corresponding destination location 208, such as in bits or bytes or the like. DOFF is an address offset value used for accessing either the corresponding destination location 208 or the destination SG table. For example, DOFF is added to ADDDST to access the corresponding destination location 208 when DDTYPE indicates that the corresponding destination location 208 is with the DD 214, or to access the destination SG table when DDTYPE indicates that the corresponding destination location 208 is instead accessible via the destination SG table. The included parameters or attributes are exemplary only in which one or more may be omitted or modified and additional parameters or attributes may be included as desired for particular configurations or implementations.

The SD 213 generally includes source stride information SSTRIDE along with other attribute information of the source (not show). If SSEN in the CFT 212 indicates that stride is disabled, then the STRIDE information in SD 213 is not used or is otherwise not applicable. The included parameters or attributes are exemplary only in which one or more may be omitted or modified and additional parameters or attributes may be included as desired for particular configurations or implementations.

The DD 214 includes a DSTTYPE value which is a destination attribute indicating a destination write transaction type (for example, a snoop or non-snoop write, an enhanced type write, etc.). A DSEN value is a destination stride enable indicating whether stride is enabled when writing the destination data to the destination location 208. A destination completion status queue enable value DCEN indicates whether the corresponding destination device is informed of completion of the multicast operation. If not disabled (e.g., DCEN=0b), then whether or not results are queued for the corresponding destination depends on the CEN value. If disabled (e.g., DCEN=1b), then results are not queued. The DD 214 also generally includes destination stride information DSTRIDE which may be used if stride is enabled. The DD 214 may also include the FQID which points to a location for queuing completion status information when enabled. The included parameters or attributes are exemplary only in which one or more may be omitted or modified and additional parameters or attributes may be included as desired for particular configurations or implementations.

Figure 4:
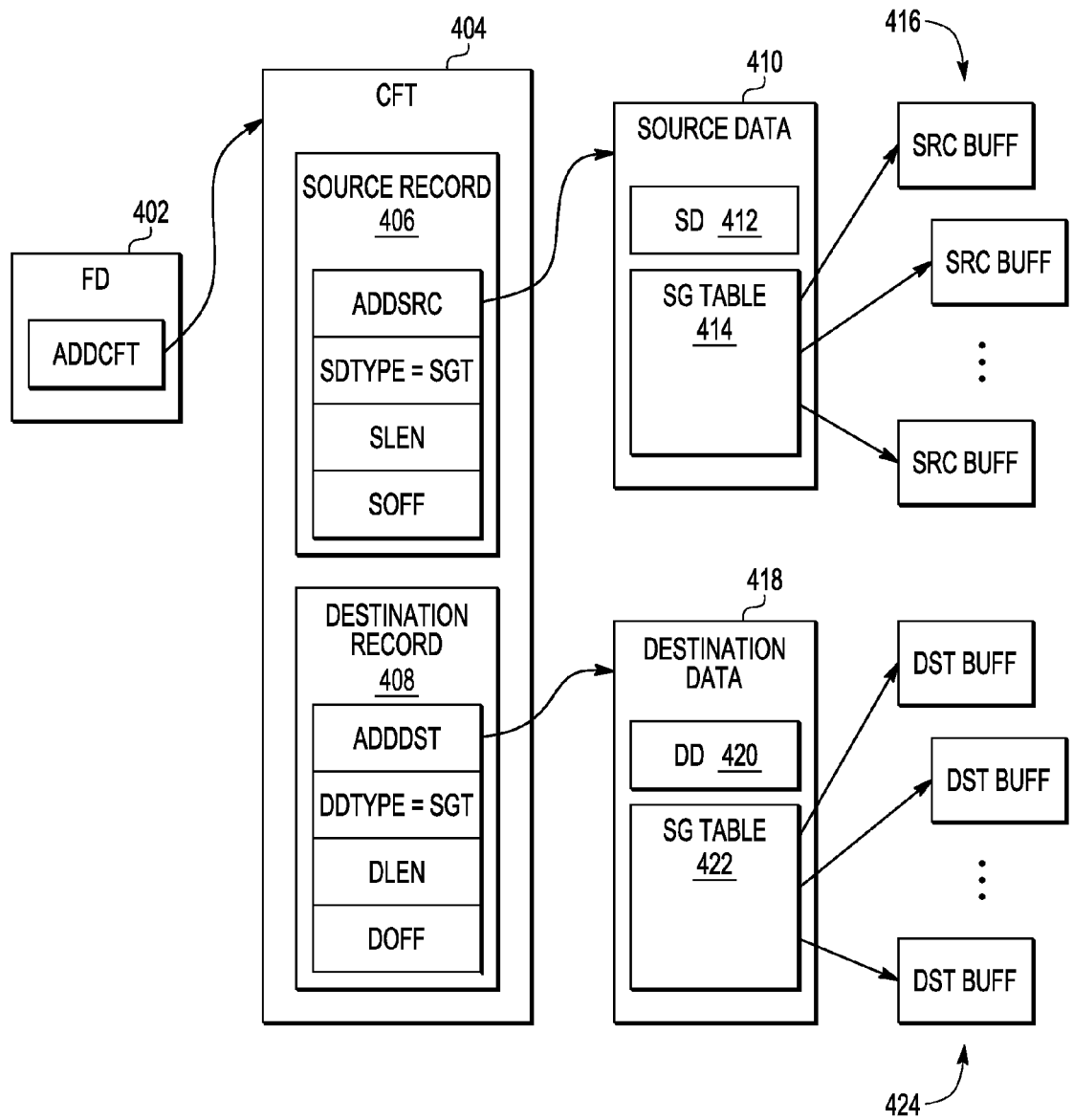
FIG. 4 is a figurative block diagram illustrating a compound frame scatter/gather format for a multicast operation to a single destination with multiple source and destination data buffers according to one embodiment.

FIG. 4 is a figurative block diagram illustrating a compound frame scatter/gather format for a multicast operation to a single destination with multiple source and destination data buffers according to one embodiment. An FD 402 is generated according to the format of the FD 211 including an address ADDCFT for accessing a corresponding CFT 404 configured according to the CFT 212. The CFT 404 includes a source record 406 according to the source record 302 and a destination record 408 according to the destination record 304. The source record 406 includes a source address ADDSRC for accessing a corresponding source data block 410. The source record 406 includes an SDTYPE value which is set to a value SGT indicating that the source data block 410 includes a source SG table, shown as SG table 414. The source record 406 further includes SLEN and SOFF as previously described.

The source data block 410 includes an SD 412 according to SD 213 and the source SG table 414. The source SG table 414 includes a list of source links (addresses or pointers or the like) each pointing to or otherwise addressing a corresponding one of a set of data buffers 416. The data buffers 416 collectively store the source data (e.g., the source data 202).

The destination record 408 includes a destination address ADDDST for accessing a corresponding destination data block 418. The destination record 408 includes a DDTYPE value which is set to a value SGT indicating that the destination data block 418 includes a destination SG table, shown as SG table 422. The destination record 408 further includes DLEN and DOFF as previously described.

The destination data block 418 includes a DD 420 according to DD 214 and the destination SG table 422. The destination SG table 422 includes a list of destination links each pointing to or otherwise addressing a corresponding one of a set of destination data buffers 424. The data buffers 424 collectively form a destination location, such as any of the destination locations 208.

The FD 402 may further include attribute information (e.g., FORMCFT, SRCTYPE, SSEN, CEN, ERR, etc.) as previously described although not shown in FIG. 4. SLEN within the source record 406 indicates the total length of the source data stored in the source data buffers 416. SOFF is added to ADDSRC to access the source SG table 414 of the source data block 410. DLEN within the destination record 408 indicates the total length of the destination buffers 424. DOFF is added to ADDDST to access the destination SG table 422 of the destination data block 418.

Figure 5:
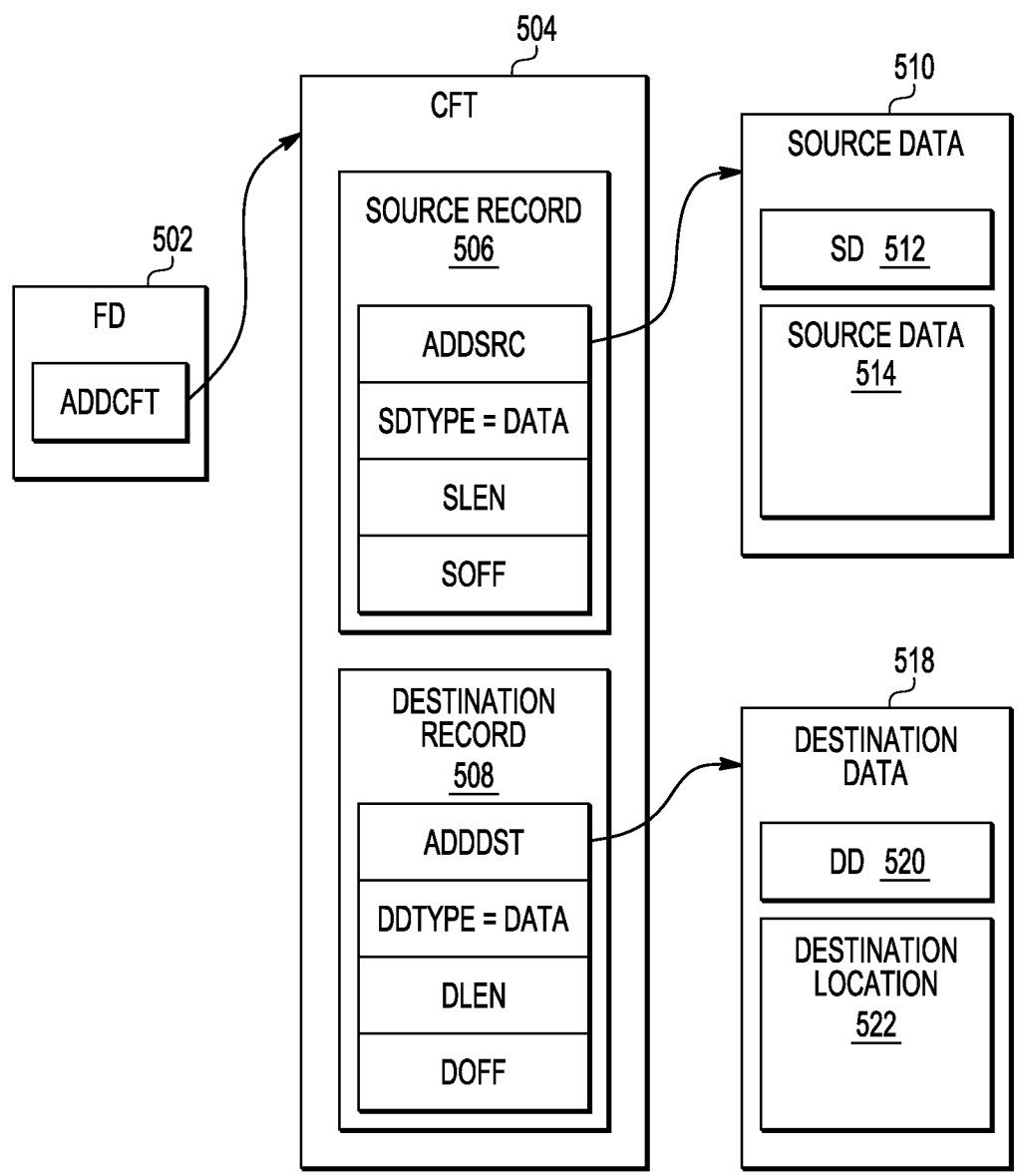
FIG. 5 is a figurative block diagram illustrating a compound frame scatter/gather format for a multicast operation to a single destination with a single source data buffer and a single destination data buffer according to one embodiment.

FIG. 5 is a figurative block diagram illustrating a compound frame scatter/gather format for a multicast operation to a single destination with a single source data buffer and a single destination data buffer according to one embodiment. An FD 504, a CFT 504, a source data block 510 and a destination data block 518 are shown in a similar manner as shown in FIG. 4. Also, the CFT 504 includes a source record 506 and destination record 508 in similar manner as shown in FIG. 4. In this case, SDTYPE has a value "DATA" which indicates that the source data block 510 does not include a source SG table but instead includes the source data within the source data block 510, shown as source data 514. Thus, SOFF is added to ADDSRC to directly access the source data 514 within the source data block 510. Also, DDTYPE also has the value "DATA" indicating that the destination data block 518 does not include a destination SG table but instead includes the destination location within the destination data block 518, shown as destination location 522. Thus, DOFF is added to ADDDST to directly access the destination location 522 within the destination data block 518.

Figure 6:
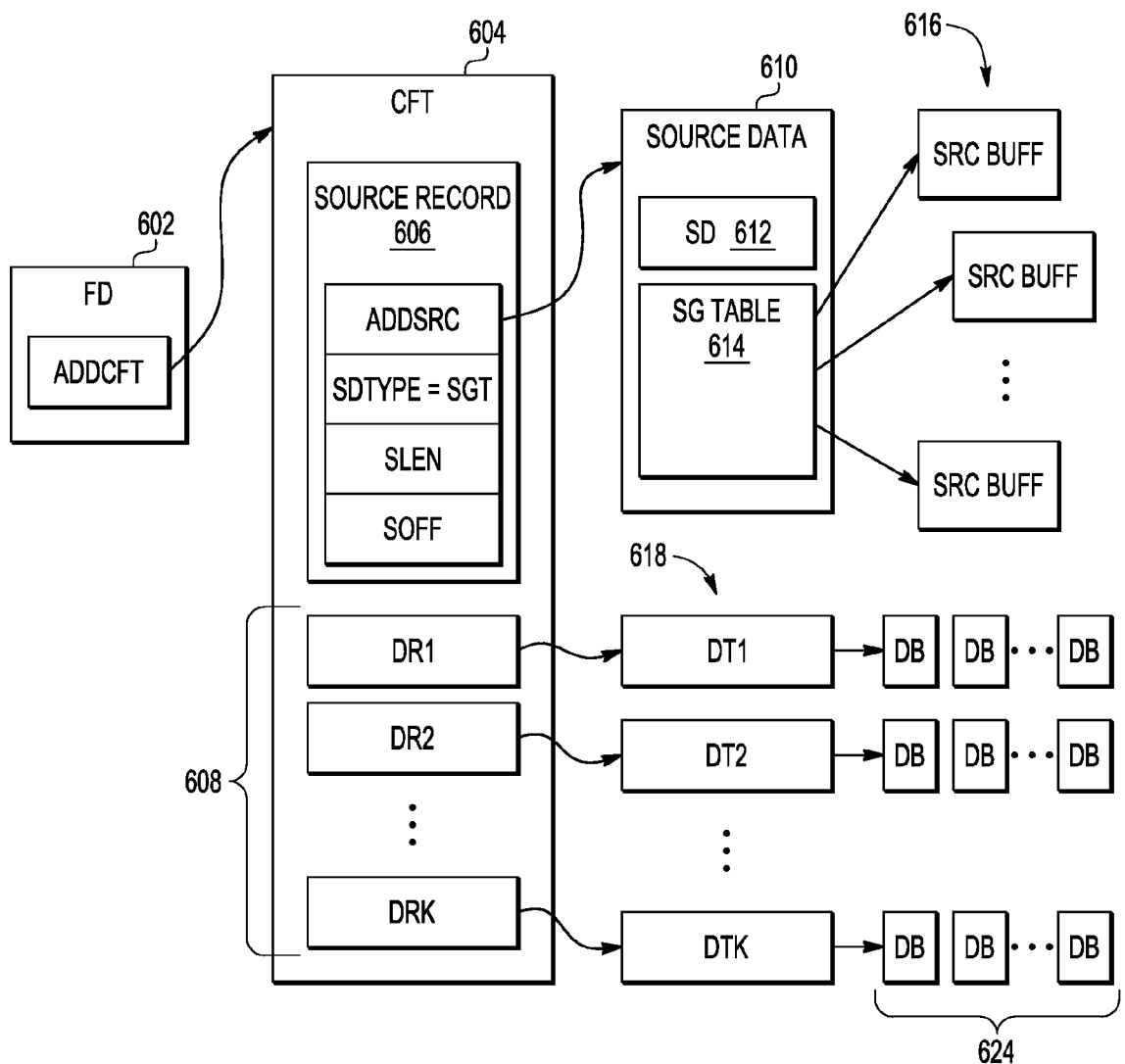
FIG. 6 is a figurative block diagram illustrating a compound frame scatter/gather format for a multicast operation to multiple destinations with multiple source and destination data buffers according to one embodiment.

FIG. 6 is a figurative block diagram illustrating a compound frame scatter/gather format for a multicast operation to multiple destinations with multiple source and destination data buffers according to one embodiment. An FD 602, a CFT 604, a source data block 610, a destination data block 618, source buffers 616 and destination data buffers 624 are included in similar manner. The CFT 604 includes a source record 606, and further includes K destination records 608, including one destination record for each of the K destination locations, individually shown as DR1-DRK.

The SDTYPE value in the source record 606 is SGT, and the source data block 610 includes an SD 612 similar to the SD 410 and a source SG table 614 similar to the source SG table 414. The source SG table 614 includes a list of source links each pointing to or otherwise addressing a corresponding one of a set of source data buffers 616 in a similar manner as previously described. In an alternative embodiment, the source record 606 may be implemented in a substantially similar manner as the source record 506 and the source data block 610 may be implemented in a substantially similar manner as the source data block 510 in which the source data is incorporated within the source data block 510.

Each of the destination records DR1-DRK may be configured in substantially similar manner as the destination record 408. Each of the K destination records DR1-DRK includes an address (similar to ADDDST) for accessing a corresponding one of a set of K destination data blocks 618, shown as DT1-DTK. Each of the destination data blocks DT1-DTK may be configured in substantially similar manner as the destination data block 418 by including a corresponding DD and destination SG table for accessing the destination data buffers 624.

In an alternative embodiment, any one or more of the destination records 608 may be configured in substantially similar manner as the destination record 508 and any one or more of the destination data blocks 618 may be configured in substantially similar manner as the destination data block 518, in which each destination location is incorporated within a corresponding one of the destination data blocks DT1-DTK.

Figure 7:
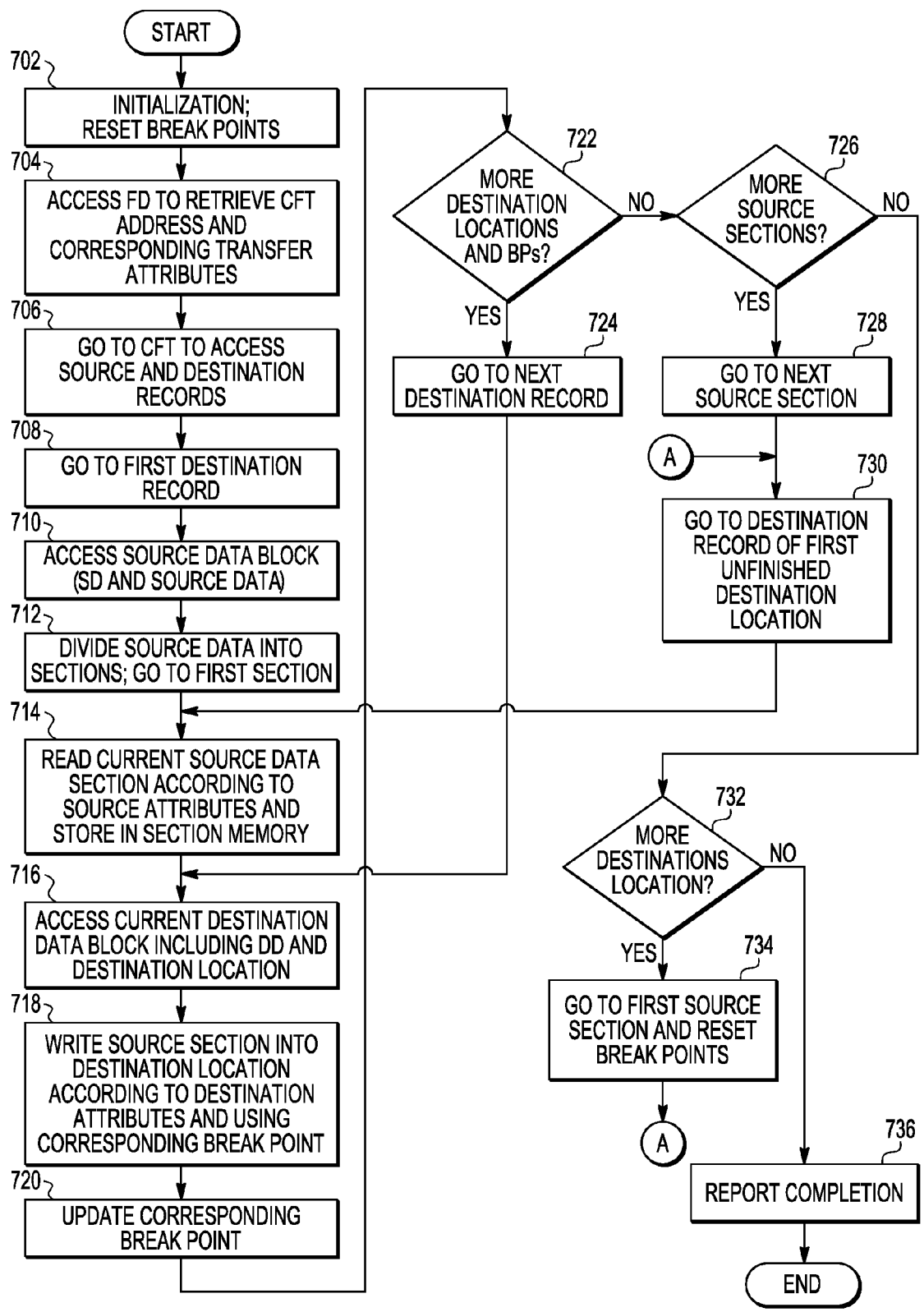
FIG. 7 is a flowchart diagram illustrating operation of the data transfer engine of FIG. 1 performing a multicast operation according to one embodiment.

FIG. 7 is a flowchart diagram illustrating operation of the data transfer engine 201 of the data transfer device 114 performing a multicast operation according to one embodiment.

As previously stated, any of the I/O devices of the I/O system 108 or any of the core processors 102 may initiate the data transfer process and/or prepare the control information 210. The data transfer engine 201 is informed via any suitable command or messaging process to perform the data transfer process. The data transfer engine 201 performs any initialization to prepare for the operation at 702, such as including, for example, resetting the break points within the break point memory 206. The data transfer engine 201 accesses the frame descriptor (e.g., FD 211) at 704 to retrieve an address to the compound frame table (e.g., CFT 212) and any additional transfer attribute information in the frame descriptor (e.g., FORMCFT, SRCTYPE, SSEN, CER, ERR, etc.).

The data transfer engine 201 accesses the CFT at 706 to further access the source and destination records and corresponding address and attribute information (e.g., ADDSRC, SDTYPE, SLEN, SOFF, ADDDST, DDTYPE, DLEN, DOFF, etc.). The data transfer engine 201 sets a pointer or the like at 708 to point to or otherwise access the first destination record within the CFT corresponding with the first destination location. The data transfer engine 201 accesses the source data block (e.g., 410) at 710 to further access the source descriptor (e.g., SD 213) and the source data either directly or via a source SG table (e.g., 414) depending upon SDTYPE. If a source SG table is accessed, the data transfer engine 201 accesses the source data (e.g., 202) via source buffers (e.g., 416) via the links within the source SG table. The data transfer engine 201 divides the source data 202 into consecutive sections at 712 in which the section size corresponds with the size of the section memory 204 within the local memory 115. In one embodiment, the section size is 256 bytes, although any suitable section size is contemplated. It is noted that if the amount of source data is less than the predetermined section size, then the source data is not divided into sections but is instead handled as one block of source data (e.g., one/first section holds entire source data block). The data transfer engine 201 also initiates a source data pointer or the like (not shown) to point to the first section of the source data 202.

The data transfer engine 201 reads the "current" section of source data (e.g., current section pointed to by source data pointer or the like) in accordance with the source attributes and stores the acquired section into its section memory 204 at 714. The data transfer engine 201 accesses the current destination data block (e.g., 418) at 716 to further access the corresponding destination descriptor (e.g., DD 420) and either the destination location, either directly (e.g., destination location 522) or via a destination SG table (e.g., 422) depending upon DDTYPE. If a destination SG table is provided, the data transfer engine 201 accesses the data buffers (e.g., 424) via the links within the destination SG table for the destination location. The data transfer engine 201 then writes the section of source data stored within the section memory 204 into the current destination location according to the corresponding destination attributes at 718. The data transfer engine 201 updates a corresponding break point at 720 for the current destination location to point to the next location within the data buffers of the current destination location.

The data transfer engine 201 queries at 722 whether there are additional destination locations and corresponding break points (BPs) to handle additional destination locations. In one embodiment, for example, the break point memory 206 is limited and there are a predetermined number of break points that may be assigned. If the number of destination locations K outnumber the available number of break points M (so that K>M), then the entire multicast operation is completed for the first M destination locations, is repeated for the next K number of destination locations and so on until all of the destination locations receive source data. In an alternative embodiment, the break point memory 206 is expandable to another memory location, such as a location within the main memory 106, or the break point memory 206 simply includes a pointer to another memory location having a variable and thus expandable number of break points to match the number of destinations.

When there are additional destination locations and available break points as determined at 722, the data transfer engine 201 advances to the next destination record within the CFT at 724, and then loops back to 716 at which the data transfer engine 201 accesses the destination data block associated with the next destination record and writes the stored section to the next destination location accessible by the next destination record at 718. Operation loops between blocks 716, 718, 720, 722 and 724 once for each of the destination locations or at least for each of the total number of available break points for the current section of source data.

When there are no more destination locations or when the list of BP is exhausted as determined at 722, then the data transfer engine 201 queries whether there are more sections of source data to be copied or transferred at 726. If there are more sections of source data to be copied or transferred as determined at 726, then the data transfer engine 201 advances to the next section of source data at 728 (such as incrementing a pointer or the like), and the data transfer engine 201 returns to the destination record of the first "incomplete" destination location at 730. As noted above, if K>M (i.e., there are more destination locations than available break points), then each group of K (or up to K) destination locations is completed followed by the next group until all destination locations are completed. The data transfer engine 201 loops back to read and store the next section of source data into the section memory 204 at 714. Operation loops again through 716, 718, 720, 722 and 724 for the next group of destination locations (inner loop) and then loops again through 726, 728, 730 and 714 (outer loop) for each section of source data until all sections are copied or transferred to the current group of destination locations.

Referring back to 726, when there are no more sections of source data to be written to the current set of destination locations (all or up to M destination locations), then the data transfer engine 201 queries whether the are any more destination records in the CFT at 732. If so, then there are more destination locations than break points. The data transfer engine 201 then returns back to the very first section of source data and resets the break points at 734. Then the data transfer engine 201 returns to 730 to access the destination record in the CFT of the first unfinished destination location, and then operation loops back to 714 to repeat the entire process for the remaining destination locations or at least the next group of M destination locations. Operation continues in this manner until the source data is written to each of the destination locations indicated within the CFT.

To illustrate by way of example, when there are a sufficient number of break points in which the number K of destination locations is less than or equal to the total number M of break points, then each section of source data is copied to each of the destination locations and the source data is read only once. If K>M, then operation is completed for the first M destination locations, and the entire operation is repeated for each group of up to M destination devices until all of the destination locations are completed. In this case, the source data 202 is read multiple times. For example, if there are 100 break points and 350 destination locations, then the source data is read four times (a first time for the first group of destination locations 1-100, a second time for the second group of destination locations 101-200, a third time for the third group of destination locations 201-300, and a fourth time for the remaining destination locations 301-350). Although the source data 202 is read multiple times, the number of source data reads is substantially reduced as compared to conventional configurations. In the above example with 100 break points and 350 destination locations, the source data 202 is read only four times according to an embodiment described herein rather than 350 times according to a conventional DMA configuration.

Referring back to 732, when there are no more unfinished destination locations, the data transfer engine 201 reports or queues the completion results at 736 for the source device and/or any of the destination devices or which completion status is enabled as previously described. After any such reporting, the multicast operation is completed.

A method of multicast data transfer according to one embodiment includes accessing a source address to a source location of mapped memory which stores source data, accessing multiple destination addresses to corresponding destination locations of the mapped memory, and for each of at least one section of the source data, reading the section using the source address storing the section into a local memory of a data transfer device, and writing the section from the local memory to each destination location in the mapped memory using the destination addresses.

A method of transferring data in mapped memory according to one embodiment includes generating a source record to include a source address for accessing source data stored at a source location in the mapped memory, generating destination records, each including a corresponding destination addresses for accessing a corresponding destination location in the mapped memory, and performing a multicast transfer operation, which includes reading the source data from the source location using the source address, storing source data to a local memory of a data transfer device, and writing the source data written in the local memory to each destination location using the destination addresses.

A data transfer system for performing a multicast operation according to one embodiment includes a mapped memory and a data transfer device coupled to a system interface. The mapped memory stores source data accessible using a source address and includes a multiple destination locations each accessible using a corresponding one of multiple destination addresses. The data transfer device includes a local memory and a data transfer engine. The data transfer engine uses the source address to read the source data and to store the source data into the local memory. The data transfer engine uses each destination address to write data from the local memory to corresponding destination locations.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method of multicast data transfer, comprising:
accessing a source address to a source location of mapped memory which stores source data;
accessing a plurality of destination addresses to a corresponding plurality of destination locations of the mapped memory;

for each of a plurality of sections of the source data, one section at a time:
reading a section using the source address;
storing the section into a local memory of a data transfer device; and
writing the section from the local memory to each of the plurality of destination locations in the mapped memory using the plurality of destination addresses.

2. The method of claim 1, wherein said accessing a plurality of destination addresses comprises accessing a plurality of destination records each storing a corresponding one of the plurality of destination addresses and each storing at least one destination attribute, and wherein said writing the section from the local memory to each of the plurality of destination locations comprises using the at least one destination attribute stored in a corresponding destination record.

3. The method of claim 1, further comprising retrieving a plurality of unique destination attributes, each used during said writing the section from the local memory to a corresponding one of the plurality of destination locations.

4. The method of claim 1, wherein after writing a section of the source data from the local memory to the plurality of destination locations in the mapped memory, further comprising updating a corresponding one of a plurality of break points within the local memory to point to a next memory location of a corresponding destination location for writing a subsequent section of the source data.

5. The method of claim 1, wherein said accessing each of a plurality of destination addresses comprises accessing a plurality of links in the mapped memory used for accessing a corresponding plurality of destination data buffers in the mapped memory.

6. The method of claim 1, wherein said accessing each of a plurality of destination addresses comprises accessing a corresponding one of a plurality of destination descriptors in the mapped memory, wherein each destination descriptor includes at least one destination attribute.

7. The method of claim 1, further comprising:
retrieving a completion status enable value in the mapped memory indicating whether to report completion to a source device and indicating whether to report completion to any of a plurality of destination devices; and
retrieving a plurality of destination completion status enable values, each indicating whether to report completion to a corresponding one of the plurality of destination devices.

8. A method of transferring data in mapped memory, comprising:
generating a source record to include a source address for accessing source data stored at a source location in the mapped memory and wherein the source data is divided into a plurality of sections;
generating a plurality of destination records, each destination record including a corresponding one of a plurality of destination addresses for accessing a corresponding one of a plurality of destination locations in the mapped memory; and
performing a multicast transfer operation for the plurality of sections of the source data, one section at a time, comprising:
reading a section of the source data from the source location using the source address;
storing the section into a local memory of a data transfer device;
writing the section stored in the local memory to each of the plurality of destination locations using the plurality of destination addresses; and
repeating said reading, storing and writing for each of the plurality of sections of the source data.

9. The method of claim 8, wherein said generating a plurality of destination records includes storing at least one attribute in each destination record which is used for accessing a corresponding destination location.

10. The method of claim 8, further comprising generating a plurality of destination descriptors, each including at least one attribute which is used for writing source data to a corresponding one of the plurality of destination locations.

11. The method of claim 8, further comprising:
generating at least one destination data block in the mapped memory accessible via a corresponding one of the plurality of destination records;
providing a destination data buffer in the at least one destination data block; and
storing a destination offset in the corresponding one of the plurality of destination records used for accessing the destination data buffer.

12. The method of claim 8, further comprising:
providing a plurality of destination data buffers in the mapped memory;
generating at least one destination data block accessible via a corresponding one of the plurality of destination records, wherein said at least one destination block includes a data table comprising a plurality of links each pointing to a corresponding one of the plurality of destination data buffers; and
storing a destination offset in a corresponding destination record in which the data table is accessible via a corresponding destination address and the destination offset.

13. The method of claim 8, further comprising updating a corresponding one of a plurality of break points stored in the local memory after writing a section of the source data to one of the plurality of destination locations.

14. A data transfer system for performing a multicast operation, comprising:
a system interface;
a mapped memory comprising at least one memory device coupled to said system interface, wherein said mapped memory stores source data divided into a plurality of sections at a source location accessible using a source address and wherein said mapped memory includes a plurality of destination locations each accessible using a corresponding one of a plurality of destination addresses; and
a data transfer device coupled to said system interface, wherein said data transfer device comprises:
a local memory; and
a data transfer engine that is configured to transfer said source data, one section at a time, from said source location to each of said plurality of destination locations, wherein said data transfer engine uses said source address to read a next one of said plurality of sections of said source data and to store said next one of said plurality of sections of said source data into said local memory, and wherein said data transfer engine uses each of said plurality of destination addresses to write said next one of said plurality of sections from said local memory to each of said plurality of destination locations.

15. The data transfer system of claim 14, wherein after writing each section, said data transfer engine stores a corresponding break point into said local memory for a corresponding one of said plurality of destination locations.

16. The data transfer system of claim 14, wherein said mapped memory stores a list of destination records each storing a corresponding one of said destination addresses and each storing at least one attribute used for accessing a corresponding one of said plurality of destination locations.

17. The data transfer system of claim 14, wherein each of said plurality of destination addresses is used to access a corresponding one of a plurality of destination descriptors stored in said mapped memory, and wherein each of said plurality of destination descriptors stores at least one destination attribute used for writing data to a corresponding destination location.

18. The data transfer system of claim 14, further comprising a source device coupled to said system interface which stores said source data, which determines said plurality of destination locations in said mapped memory, and which invokes said data transfer engine to perform said multicast operation.

19. The data transfer system of claim 14, further comprising:
- at least one core processor coupled to said system interface; and
- an input/output system coupled to said system interface comprising a plurality of input/output devices including said data transfer device.

\* \* \* \* \*